J. M. FRASER.
MUD GRIP FOR AUTOMOBILES.
APPLICATION FILED DEC. 6, 1913.
1,140,028.
Patented May 18, 1915.
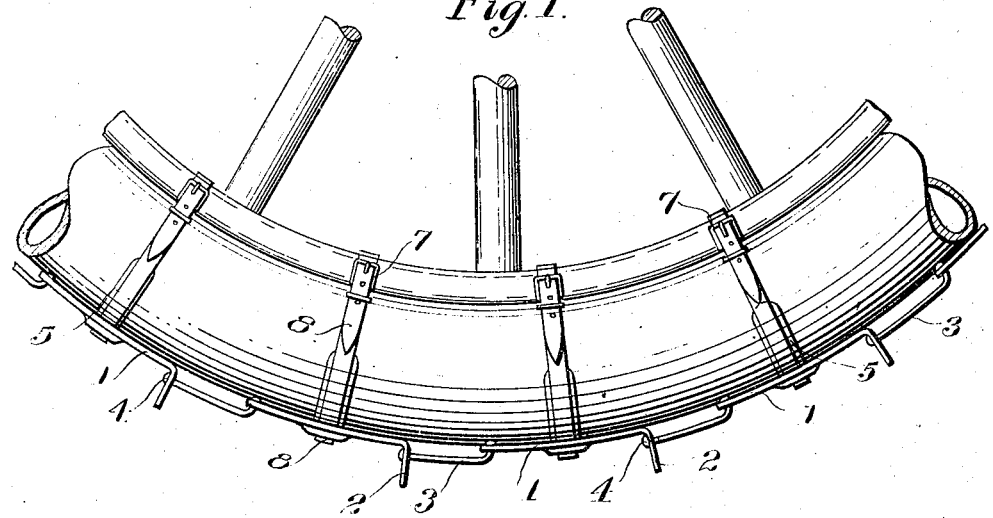
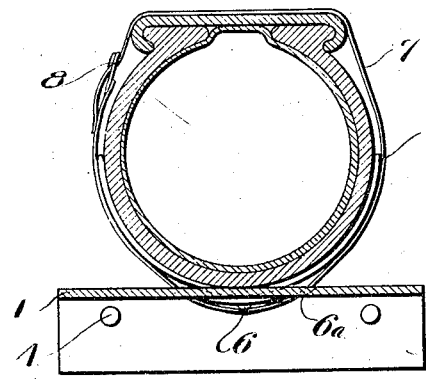
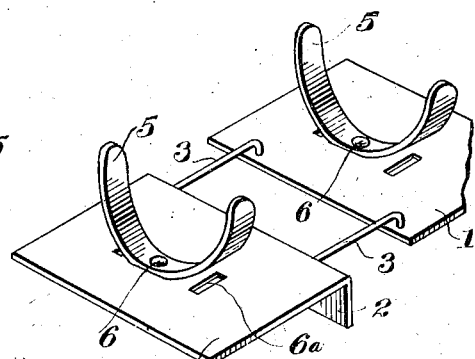
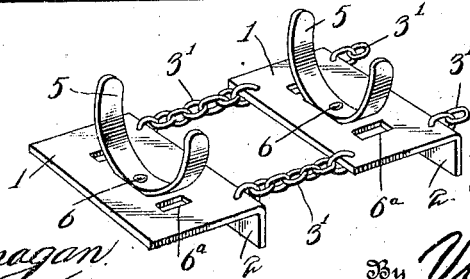
Inventor
James M. Fraser
By Victor J. Evans
Attorney
Witnesses

UNITED STATES PATENT OFFICE.

JAMES M. FRASER, OF EMPRESS, ALBERTA, CANADA.

MUD-GRIP FOR AUTOMOBILES.

1,140,028. Specification of Letters Patent. Patented May 18, 1915.

Application filed December 6, 1913. Serial No. 805,182.

*To all whom it may concern:*

Be it known that I, JAMES M. FRASER, a citizen of Canada, residing at Empress, in the Province of Alberta and Dominion of Canada, have invented new and useful Improvements in Mud-Grips for Automobiles, of which the following is a specification.

This invention relates to mud grips for automobiles and other motor driven vehicles, the object of the invention being to produce an effective and economical attachment applicable to the wheel of an automobile and designed to obtain a firm hold and grip on a muddy section of a road to enable the machine to be driven therefrom to more solid ground.

With the above and other objects in view, the invention consists in the novel construction, combination and arrangement of parts, as will hereinafter be more fully described, illustrated and claimed.

In the accompanying drawings:—Figure 1 is a side elevation of a portion of the driving wheel of a motor propelled machine showing the mud grip of this invention applied thereto. Fig. 2 is a cross section through the same on an enlarged scale. Fig. 3 is a perspective view of the mud grip detached. Fig. 4 is a perspective view similar to Fig. 3 showing the use of chains instead of the links illustrated in Fig. 3.

The mud grip contemplated in this invention is composed of a longitudinal series of gripping elements connected together by links so as to adapt the mud grip as a whole to be placed longitudinally around the tire of a wheel in the manner illustrated in Fig. 1.

Each of the gripping elements is composed of metal and comprises a body portion 1 adapted to rest against the tread portion of the tire and a flange or gripping portion 2 forming an integral part of the body and extending substantially at right angles thereto as clearly illustrated in the drawings, each of the gripping elements being thus substantially L-shaped in cross section.

The gripping elements are connected together in the form of a chain by means of parallel links 3 as best illustrated in Fig. 3, the said links being shown as consisting of short lengths of rods headed as shown at 4 and passed through holes in the gripping sections, thereby permitting the mud grip as a whole to be placed around the tire and to conform to the circumference and curvature thereof.

Each of the gripping elements is provided on the inner side thereof with a substantially U-shaped stirrup 5 consisting of a strap of iron bent into shape and riveted or otherwise fastened as shown at 6 to the body portion of its respective gripping element. The stirrups are designed to fit over the tire in applying the mud grip as a whole thereto and serve to keep the device centered in proper relation to the tire.

At opposite sides of the center of each stirrup 5, the body portion 1 of each gripping element is provided with holes 6 through which is passed a flexible strap 7 having a buckle 8 at one end thereof.

The mud grip is fastened to the wheel and tire by passing the straps 7 around the tire and felly and securing the ends thereof together between the spokes.

When the mud grip hereinabove described is placed upon one of the driving wheels of the machine, and power transmitted to said wheel from the engine, the flanges or gripping portions 2 obtain a firm positive hold or grip on any soft surface such as mud thereby imparting the necessary tractive properties to the wheel to enable the automobile or other motor propelled vehicle to extricate itself and reach more solid ground where the mud grip may be removed from the tire and dispensed with. The device when not in use may be compactly folded and stored away in a convenient part of the machine.

In lieu of the connecting links 3 illustrated in Fig. 3, flexible connections such as chains 3' may be used as shown in Fig. 4 thereby giving still greater flexibility to the grip as a whole and enabling the same to be readily adjusted around the tire and compactly folded and stored away when not in use.

What I claim is:—

A mud grip for motor propelled vehicles, comprising a chain of mud gripping elements each embodying a body portion and a flange extending substantially at right angles thereto on the outer exposed side, a U-shaped stirrup secured to the inner face of each of the gripping elements, links arranged in parallel relation to each other and connecting the gripping elements, and straps passing through each of said elements and embracing said stirrups, substantially as described.

In testimony whereof I affix my signature in presence of two witnesses.

JAMES M. FRASER.

Witnesses:
DONALD FRASER,
J. W. OWENS.